United States Patent [19]

Haselkorn et al.

[11] Patent Number: 5,571,755

[45] Date of Patent: Nov. 5, 1996

[54] COMPOSITION AND PROCESS FOR FORMING DIESEL ENGINE ELEMENTS

[75] Inventors: Michael H. Haselkorn; Michael C. Long, both of Peoria, Ill.

[73] Assignee: Caterpillar Inc., Peoria, Ill.

[21] Appl. No.: 333,464

[22] Filed: Nov. 2, 1994

[51] Int. Cl.$^6$ ............... C03C 1/00; C03C 10/12; C03C 10/8; C04B 35/52

[52] U.S. Cl. ............... 501/32; 501/7; 501/8; 501/9; 501/99; 501/95

[58] Field of Search ............... 501/32, 7, 8, 9, 501/95, 99

[56] References Cited

U.S. PATENT DOCUMENTS

| | | |
|---|---|---|
| 3,681,187 | 8/1972 | Bowen et al. ............... 161/170 |
| 3,954,479 | 5/1976 | Jahn ............... 501/32 |
| 4,263,367 | 4/1981 | Prewo ............... 428/338 |
| 4,511,663 | 4/1985 | Taylor ............... 501/32 |
| 4,748,136 | 5/1988 | Mahulikar et al. ............... 501/32 |
| 4,883,778 | 11/1989 | SinghDeo et al. ............... 501/32 |

*Primary Examiner*—Mark L. Bell
*Assistant Examiner*—Louis M. Troilo
*Attorney, Agent, or Firm*—Pankaj M. Khosla

[57] ABSTRACT

A composition and process are disclosed for constructing a diesel engine element, such as for example, a valve guide which will withstand the friction of various tribological locations in a diesel engine when operating the engine at elevated temperatures and/or on alternative fuels. The composition is one of a glass, glass-ceramic, and mixtures thereof matrix having graphite particles. In the process, a unitary element is formed from the mixture and thereafter is sintered for a time and temperature sufficient to obtain a preselected density.

8 Claims, No Drawings

COMPOSITION AND PROCESS FOR FORMING DIESEL ENGINE ELEMENTS

TECHNICAL FIELD

A composition and process for forming diesel engine elements for use in environments of high elevated temperatures and friction. The composition of the element is one of a glass, glass-ceramic and mixtures thereof matrix having a preselected density and graphite particles dispersed therein.

BACKGROUND ART

In the art of diesel engine design and construction, it has been discovered that where the diesel engine is to be operated using alternative fuels; ie fuels other than diesel, that such alternative fuels are cleaner burning and do not form deposits at critical tribological interfaces, such as valves and valve seats. These deposits act as solid lubricants protecting the various engine elements from wear.

This problem is further exacerbated by engine technology which is moving toward increased insulation of the combustion chamber to provide low heat rejection engines. This insulation increases the operating temperature in a number of critical tribological interfaces. Such interfaces are the valve guide/valve stem and valve seat/valve face where the operating temperature can be above 350 degrees C. At such high temperatures, commercially available liquid lubricants are ineffective.

This invention is directed to overcome this wear problem by the construction of diesel engine elements which are self-lubricating.

DISCLOSURE OF THE INVENTION

In one aspect of the invention a composition is disclosed for a diesel engine element subjected to elevated temperatures and friction. The composition is one of a glass, glass-ceramic, and mixtures thereof matrix having a density greater than about 2.0 g/cm$^3$ and having graphite particles generally uniformly dispersed therein. The graphite particles are present in the range of about 10 to about 50 percent by volume.

In another aspect of the invention, a process is disclosed for forming a diesel engine element subjected to elevated temperatures and friction. In the process, a mixture of a glass matrix having graphite particles generally uniformly dispersed therein and being present in the range of about 10 to about 50 percent by volume is provided. An element is formed from the mixture. The element is then sintered for a time and temperature sufficient to obtain a preselected density.

BEST MODE FOR CARRYING OUT THE INVENTION

The composition of this invention is found useful in forming diesel engine elements or parts which are subjected to high temperatures and friction.

The composition comprises one of a glass and glass-ceramic matrix having a density greater than about 2.0 g/cm$^3$ and having graphite particles generally uniformly dispersed therein. The graphite particles are present in the range of about 10 to about 50 percent by volume, preferably about 15 percent by volume.

The matrix of this invention is preferably glass-ceramic selected from one of barium-magnesium, aluminumsilicate and lithium aluminumosilicate, preferably calcium-aluminosilicate.

The matrix can also be a glass composition selected from one of soda-alumina-borosilica, soda-borosilica, and silica-alkali-barium borosilica as manufactured by Corning, Inc. under the respective product numbers CGW-9740, CGW-7740, and CGW-7052, preferably soda-alumina-borosilica.

It should be understood that selection of the matrix, whether it be glass or glass-ceramic will be based on the configuration and use of the diesel engine element and one skilled in the art can readily make the selection without undue experimentation.

The configuration of the graphite can be graphite flakes, continuous fibers, and mixtures thereof, preferably chopped fibers. The graphite particles can also include nickel for additional lubrication.

In the preferred embodiment, nickel is present in the graphite in the range of about 1% to about 10% by volume. The nickel is preferably present in the form of particulates.

Diesel engine elements of the composition of this invention can be formed by the process of this invention. In the process of this invention, a mixture is provided of glass matrix, graphite particles generally uniformly dispersed therein and being present in the range of about 10 to about 50 percent by volume.

Sufficient pressure can be applied on the mixture to consolidate the mixture into a unitary element. Methods and apparatus for applying such pressure to form a unitary element are well known in the art, such as for example tape casting, cold pressing laminate, melt infiltration of glassy phase into preform, cold isostatic pressing, and hot pressing, preferably cold isostatic pressing.

The preferred method, apparatus, and process depend upon the size and configuration of the element being formed and one skilled in the art can make the selection without undue experimentation. If so used, the preferred consolidating method is cold isostatic pressing.

The element is thereafter sintered for a time and temperature sufficient to obtain a preselected density. The final density required is a function of desired wear and mechanical properties and is a value easily determined by one skilled in the art without undue experimentation.

After sintering, the element can also be devitrified which will form crystals within the matrix and increase the temperature limit of the element.

In one preferred example, the composition and process of this invention were used for forming a diesel engine valve guide.

INDUSTRIAL APPLICABILITY

The physical properties of the example resultant valve guide had friction coefficients less than heretofore utilized valve guides without the utilization of additional liquid lubrication. This resultant valve guide is capable of operating at greater temperatures and with less particulate emissions.

Other aspects, objects and advantages of this invention can be obtained from a study of the disclosure and the appended claims.

We claim:

1. A composition for a diesel engine element subjected to elevated temperatures and friction, comprising:

a matrix of a glass, glass-ceramic, or mixtures thereof
said matrix having a density greater than about 2.0 g/cm³ and said matrix having lubricating graphite particles generally uniformly dispersed therein,
said graphite particles being present in the range of about 10 to about 50 percent by volume,
said glass matrix being one of soda-borosilica, soda-alumina-borosilica and silica-alkali-barium borosilica,
said glass-ceramic matrix being one of barium-magnesium-aluminumsilicate, lithium-aluminumosilicate, and calcium-alumino-silicate, and
a metal uniformly dispersed within said graphite particles, said metal being nickel.

2. A composition, as set forth in claim 1, wherein said glass-ceramic matrix is calcium-alumino-silicate.

3. A composition, as set forth in claim 1, wherein said glass matrix is soda-alumina-borosilica.

4. A composition, as set forth in claim 1, wherein the configuration of the graphite particles are one of graphite flakes, chopped fibers, continuous fibers, and mixtures thereof.

5. A composition, as set forth in claim 1, wherein the configuration of the graphite particles is chopped fibers.

6. A composition, as set forth in claim 1, wherein the matrix is glass-ceramic and said composition has an operating temperature limit greater than about 350 degrees C.

7. A composition, as set forth in claim 1, wherein said nickel metal is present in the graphite in the range of about 1% to about 10% by volume.

8. A composition, as set forth in claim 7, wherein the configuration of the metal is particulate.

\* \* \* \* \*